United States Patent
Akens et al.

(10) Patent No.: US 10,102,403 B1
(45) Date of Patent: Oct. 16, 2018

(54) MULTI POSITION ROTARY SWITCH OPERATING AS A SECURITY PIN

(71) Applicant: MOTOROLA SOLUTIONS, INC, Chicago, IL (US)

(72) Inventors: Jody H. Akens, Weston, FL (US); Michael Page, Miami, FL (US); Ryan M Nilsen, Plantation, FL (US); Jari P. Jarvinen, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/835,800

(22) Filed: Dec. 8, 2017

(51) Int. Cl.
| | |
|---|---|
| G06F 21/83 | (2013.01) |
| G07C 9/00 | (2006.01) |
| G06F 21/33 | (2013.01) |
| G06K 7/10 | (2006.01) |
| G06F 3/0362 | (2013.01) |
| H04M 1/67 | (2006.01) |

(52) U.S. Cl.
CPC ............ G06F 21/83 (2013.01); G06F 21/335 (2013.01); G06K 7/10237 (2013.01); G07C 9/00706 (2013.01); G06F 3/0362 (2013.01); G07C 2009/00833 (2013.01); H04M 1/67 (2013.01)

(58) Field of Classification Search
CPC .. E05B 37/00; E05B 37/0003; E05B 37/0006; E05B 37/0017; E05B 37/0044; E05B 37/0048; G06F 21/00; G06F 21/30; G07C 9/00666; G07C 9/00698; G07C 9/00912
See application file for complete search history.

(56) References Cited

U.S. PATENT DOCUMENTS

| | | | |
|---|---|---|---|
| 4,192,993 A | 3/1980 | Wechsler | |
| 5,159,706 A * | 10/1992 | Hodsdon | H01H 19/03 200/11 R |
| 5,986,563 A | 11/1999 | Shapiro | |
| 6,925,169 B2 | 8/2005 | Habu | |
| 7,223,926 B1 * | 5/2007 | Gannon | G05G 1/082 200/11 R |
| 7,592,562 B1 * | 9/2009 | Vanderwege | H01H 3/20 200/336 |
| 8,825,928 B2 | 9/2014 | Jeal et al. | |
| 9,304,736 B1 * | 4/2016 | Whiteley | G06Q 20/40145 |
| 2013/0333020 A1 | 12/2013 | Deshpande | |
| 2015/0381230 A1 * | 12/2015 | Suppelsa | H04W 4/90 455/77 |
| 2016/0349859 A1 | 12/2016 | Seitz et al. | |

FOREIGN PATENT DOCUMENTS

GB 2394327 A 4/2004

\* cited by examiner

Primary Examiner — Carlos E Garcia
(74) Attorney, Agent, or Firm — Barbara R. Doutre

(57) ABSTRACT

A multi-position rotary control provides authentication for a battery operated portable communication device. The rotary control provides a rotary switch pin code which is combined with voice authentication as part of an authentication process. Upon completion of authentication, the rotary control reverts back to a default radio control.

20 Claims, 3 Drawing Sheets

MULTI POSITION ROTARY SWITCH OPERATING AS A SECURITY PIN

FIELD OF THE DISCLOSURE

The present disclosure relates generally to portable communication devices and more particularly to authentication of a non-keypad portable communication device.

BACKGROUND

Portable communication devices, particularly those used in public safety environments, such as law enforcement and fire rescue, need to be protected from unauthorized use. In some portable communication devices, a keypad may be used to enter a user's identification thereby ensuring proper authentication. However, efforts are being made to maintain or increase the functionality of non-keypad portable communication devices, such as non-keypad portable two-way radios used in public safety environments. Hence, there is a need to protect these non-keypad devices from unauthorized use.

Accordingly, there is a need to for an improved approach to authentication of a portable communication device, particularly a non-keypad portable communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
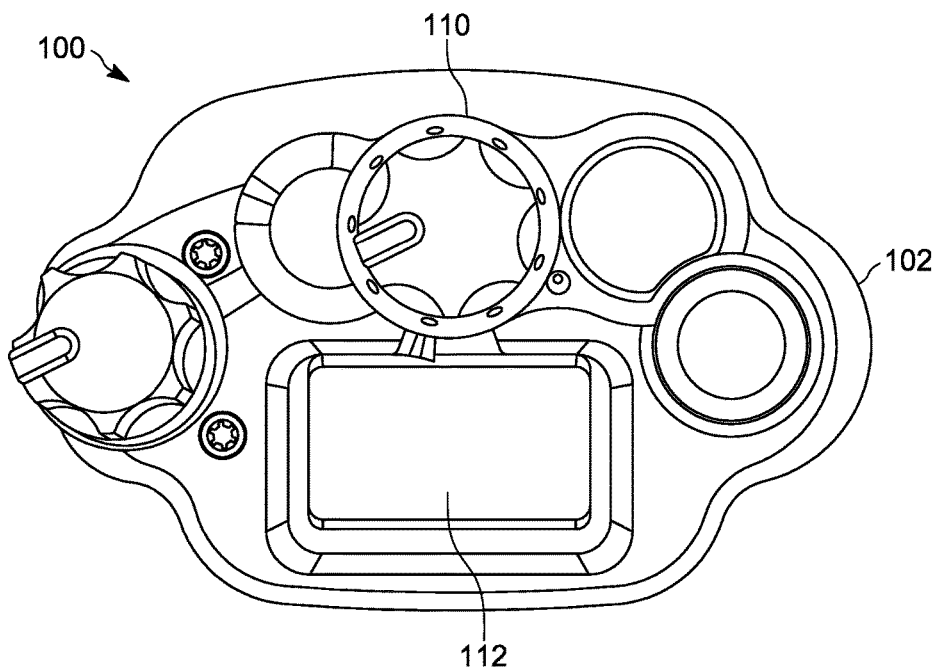
FIG. 1 is a top view of a portable electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a multi position rotary control for authentication of a battery operated portable communication device. The rotary control provides a rotary switch pin code which is combined with voice authentication as part of a two-step authentication process. Upon completion of authentication, the rotary control reverts back to a default radio control.

Figure 2:
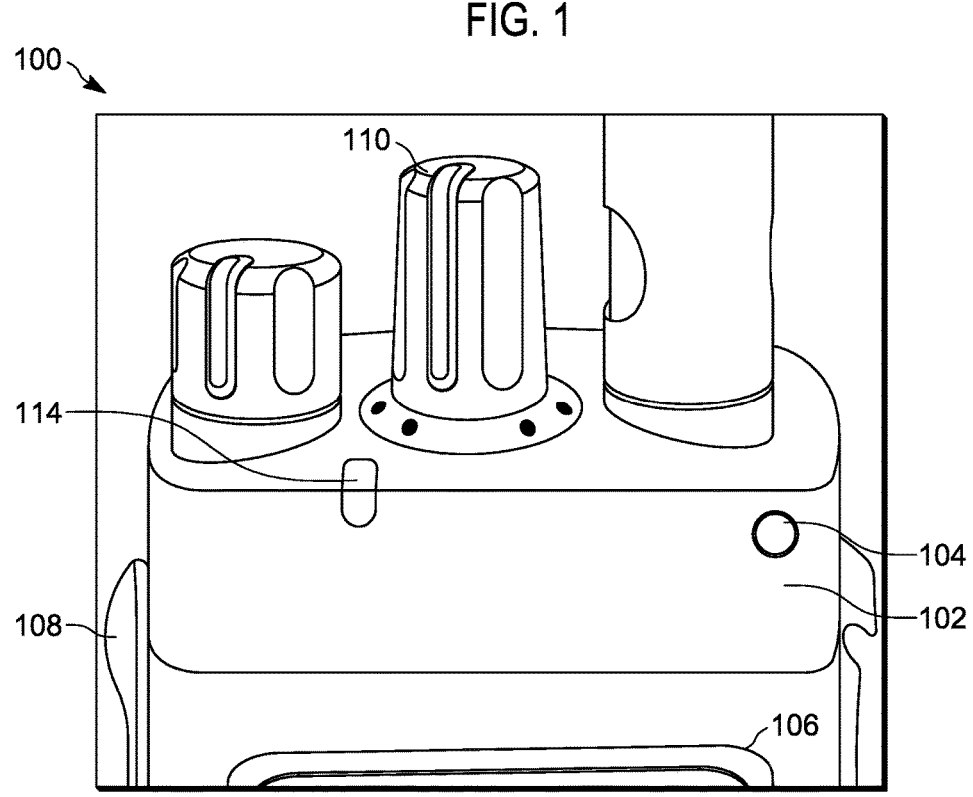
FIG. 2 is a front and top view of a portable communication device in accordance with some embodiments.

FIG. 1 is a top view of a portable communication device 100 formed in accordance with some embodiments, and FIG. 2 is a front and top view of a portable communication device in accordance with some embodiments. Referring to FIGS. 1 and 2, the portable communication device 100 may comprise for example a portable two-way radio, remote speaker microphone (RSM) and/or other wireless radio frequency (RF) communication devices. The portable communication device 100 comprises a housing 102 containing appropriate electronics, such as a battery, a controller and a transceiver having electronic circuitry, known or yet to be developed, for generating and receiving radio frequency (RF) communications, such as circuitry for operation in VHF, UHF, and/or 7/800 MHz frequency bands, to name a few. For example, controller electronics may comprise microprocessor controlled audio circuitry further comprising a microphone 104 and speaker 106 and the transceiver electronics may comprise transmitter and receiver circuitry for appropriate signal generation and reception, filtering, and amplification. The portable two-way radio 100 further comprises a push-to-talk (PTT) button 108 which enables talking using half-duplex communications via a momentary button to switch from voice reception mode to transmit mode. The portable radio 100 may provide voice command functionality, such as a virtual assistant that provides a software agent that can perform tasks or services for an individual. The portable two-way radio 100 may further comprise user interface features, such as a display 112 and LED(s) 114.

In accordance some embodiments, the portable communication device 100 is a non-keypad portable radio having a rotary control knob 110 coupled to the housing 102. The rotary control knob 110 is coupled externally to the housing and internally to the controller. In accordance with the embodiments, the rotary control knob 110 comprises a multi-position rotary control switch that provides both a radio default control function and an authentication control function. The multi-position rotary control switch provides tactile and audible feedback in the form of clicks. The multi-position rotary control switch may comprise, for example, a 16-position rotary switch, such as a sixteen-position binary coded switch. In accordance with the embodiments, the switch operates as a default control function, such as a radio channel change control function, which further operates as a source for entering a predetermined multi-digit sequence of numbers, referred to herein as a rotary switch pin code.

The rotary switch pin code provided by rotary control knob 110 preferably operates, as part of a two step authentication process. The two step authentication process utilizes a combination of voice authentication followed by the rotary switch pin code entry. In accordance with some embodiments, the portable radio may provide virtual partner or some other voice command functionality, wherein the radio is responsive to voice inquiries and commands. Accordingly, a voice command may be used as a first authentication step, which alters the functionality of the rotary control knob 110, followed by entry of a predetermined rotary switch pin code, entered via the multi-position rotary control switch of rotary control knob 110.

To initially set and save a rotary switch pin code, a user presses the PTT button 108 and provides a voice command to the radio to register a PIN code. To select a position as a rotary switch pin code, a user rotates the control knob at a normal rate of operation, for example 0.5 seconds per click, then stops at a position for a predetermined minimum amount of time, such as one-second. The rotary switch pin code may be entered in a clockwise rotation direction, a counter-clockwise rotation direction, or a combination of clockwise and counter-clockwise rotation directions. The portable radio 100 then provides user feedback indicating that the selected position is being registered as a rotary switch pin code. The indication provided by the portable radio 102 confirming registration of a rotary switch pin code may occur via an audio message, alert or tone generated at speaker 106, an visual indicator at the display 112, and/or an indicator via the LED 114, such as blinking or color change (for example green for pass). The radio is now programmed with the customized rotary switch pin code. The rotary switch pin code is thus also said to be registered in the portable radio 100 as an authentication code.

During regular operation of the portable radio 100, the user turns on the radio and in response thereto the radio generates a first audible request to provide a voice authentication. The user speaks a predetermined authentication word or phrase, such as the user's name or some other predetermined word or phrase. Voice authentication is a type of user authentication that uses voiceprint biometrics and relies on the fact that vocal characteristics are unique for each individual. Once voice authentication is approved, the radio then follows with a second request to enter a registered authentication code. The user may then rotate the control knob 110 is accordance with his/her user selected registered rotary switch pin code. In some embodiments, the portable radio 100 may provide a time-base limit within which entry of digits for the registered rotary pin code must be entered.

If the entered rotary switch pin code passes, then a user feedback acknowledgement is provided of the pass status via a predetermined audio tone, alert, or message, and/or a display message acknowledgement, and/or and LED acknowledgement. Regular operation of the radio may then begin. Upon regular operation being enabled, the rotary control knob 110 returns back to its default functionality, such as a channel change rotary control knob functionality.

If authentication fails, then an indication of failed authorization is generated. A failed status may be indicated via an audio tone or message generated from speaker 106, for example "authentication failed" or the like, and/or the display 112 displaying a message such as "authentication failed" or the like, and/or the LED(s) 114 indications, for example a red LED color for fail or a predetermined blinking rate for fail. The ability to break the code is minimized by not providing an indication to each individual digit entry as being correct or incorrect and providing only a failed status indication in response to the entire entry.

In accordance with some embodiments, the rotary control knob 110 may comprise a coded rotary switch, rotary encoder, to name a few. For example, the rotary control knob 110 may be a binary coded decimal rotary switch. The rotary control knob 102 used for authentication can be extrapolated to a switch with as few as two positions, if desired.

Figure 3:
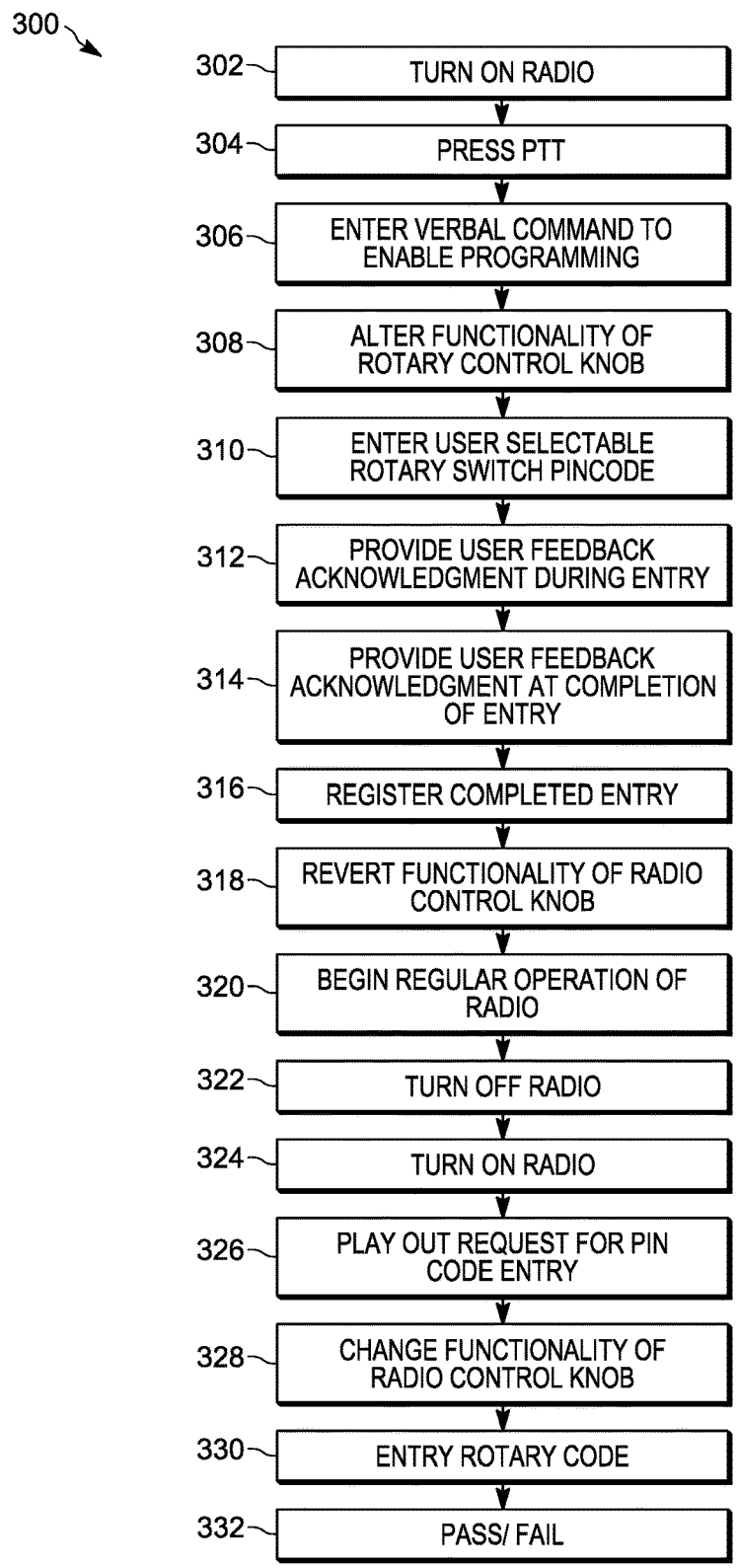
FIG. 3 is a flow diagram for operation of portable communication device in accordance with some embodiments.

FIG. 3 is a flow diagram for operation of portable communication device 100. The non-keypad radio may further be a non-display radio, which uses LED(s) 114 and/or audio indicators via speaker 106. The non-keypad radio may also be a non-display radio, which uses LED or audio indicators. The method begins beings at 302 by turning on the portable radio. To registration process begins at 304 by pressing a push-to-talk (PTT) button and entering a predetermined voice command (into the microphone) to enable programming at 306. The radio alters the functionality of a rotary control knob of the portable radio, from a radio control function to a registration control function, in response to the predetermined voice command. A user selectable rotary switch pin code is entered at 310 using the rotary control knob. The radio may provide acknowledgments during the entry process at 312, such as audible tones or LED alerts, as previously described, indicating that a digit has been successfully registered. The radio may further provide a final user feedback acknowledgment upon completion of the rotary switch pin code entry process at 314, such as audible tones or LED alerts, as previously described. The radio registers the completed user selectable rotary switch pin code as a registered rotary switch pin code at 316. The rotary control knob then reverts back radio control knob functionality at 318, so that regular operation of the radio can then begin at 320.

The method 300 further comprises subsequent operation of the radio, where the radio has been turned off at 322 and then turned back on again at 324. Turning the radio off and then on again causes the radio to play out an audible request for the registered pin code at 326. Turning the radio off and then on again also causes changing functionality of the rotary control knob from the radio control function to a rotary switch pin code mode. This mode will only enable authentication upon receipt of the appropriate registered code.

By entering the previously registered rotary switch pin code via the rotary control knob at 330, the authentication will be approved and a pass will result at 332 so that regular operation of the radio can commence (with the rotary control knob once again going back to a radio control function). Anything other than the previously registered rotary switch pin code being entered will result in a fail status alert at 332, and the radio will not operate.

Audible and/or visual alerts as to the pass/fail status may be generated. A pass status alert will only be generated upon completion of an entire entry of a registered rotary switch pin code, and a failed status alert will only be provided upon completion of an entire invalid entry (i.e. a non-registered rotary switch pin code) thereby minimizing hacking of the code. Thus, post registration activity provides status alerts at the completion of a multi-digit entry code, whereas during the registration process acknowledgment alerts are provided upon entry of each digit so that the user knows that the individual digits are being correctly registered.

Figure 4:
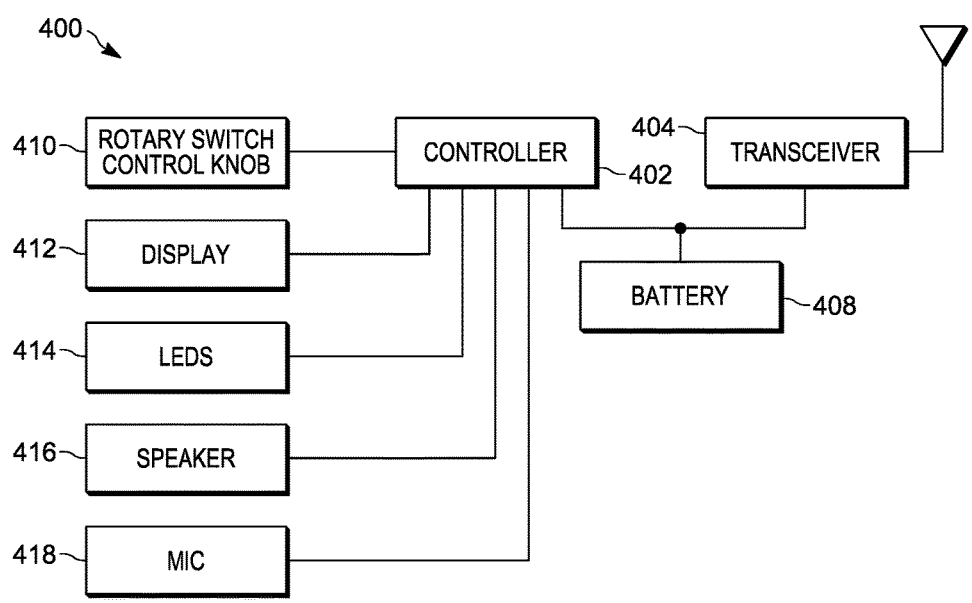
FIG. 4 is a block diagram of the portable communication device in accordance with some embodiments.

FIG. 4 is a block diagram of a portable radio 400 formed and operating in accordance with the various embodiments. Portable radio 400 comprises a controller 402 and a transceiver 404 powered by a battery 408. Controller 402 provides virtual partner or some other voice command functionality, wherein the radio is responsive to voice inquiries and commands. Portable radio 400 further comprises a microphone 418 for receiving audible requests and commands such as described by the embodiments. Portable radio 400 further comprises a speaker 416 for generating the audible messages, alerts and/or requests as described by the various embodiments. The portable radio 400 further comprises a rotary control knob 410 (coupled externally to the housing of FIGS. 1 and 2) and internally to the controller 402, The controller 402 receives inputs from and provides control of the rotary switch control knob 410 operating in accordance with the various embodiments. The controller 402 controls the functionality of the rotary switch control knob 410 to change functionality between a radio control function, such as a channel change, and a registration pin entry function, and once registered, the operational pin entry function.

In accordance with the embodiments, the multi position rotary control knob 410 provides authentication for the battery operated portable communication device. The rotary control 410 provides a rotary switch pin code which is combined with voice authentication as part of the two-step authentication process. Upon completion of authentication, the rotary control reverts back to a default radio control for regular radio operation. When the radio is turned off and back on again, the radio generates a request for the registered pin code and switches the functionality to rotary control 410 to receive the registered pin code. Hence, only users entering the proper registered code will be able to be authenticated.

Accordingly, there has been provided a multi position rotary control provides authentication for a battery operated portable communication device. The rotary control provides a rotary switch pin code which is combined with voice authentication as part of a two-step authentication process. Upon completion of authentication, the rotary control reverts back to a default radio control.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A portable radio, comprising:
  a housing; and
  a rotary control knob coupled externally to the housing and internally to a multi-position rotary control switch providing user feedback upon rotation, the multi-position rotary control switch providing both a default radio control function and an authentication control function for the portable radio, the authentication control function being responsive to a rotary switch pin code of the multi-position rotary control switch.

2. The portable radio of claim 1, wherein the multi-position rotary control switch provides the authentication control function by operating as a source for entering the rotary switch pin code.

3. The portable radio of claim 2, wherein the rotary switch pin code comprises a predetermined multi-digit sequence of numbers entered by the multi-position rotary control switch of the externally coupled rotary control knob.

4. The portable radio of claim 3, wherein the predetermined multi-digit sequence of numbers are user-selectable.

5. The portable radio of claim 4, wherein the user selectable multi-digit sequence of numbers are entered using at least one of:
  a clockwise rotation direction;
  a counterclockwise rotation direction; and
  a combination of clockwise rotation direction and counter-clockwise rotation direction.

6. The portable radio of claim 5, wherein the rotary switch pin code is registered in the portable radio as an authentication code.

7. The portable radio of claim 2, wherein during entry of the rotary switch pin code, a user feedback acknowledgment alert is generated indicating that each digit is successfully registered.

8. The portable radio of claim 7, wherein a final user feedback acknowledgment alert is generated indicating completion of registration of the rotary switch pin code.

9. The portable radio of claim 2, wherein regular radio operation is enabled by turning the radio on, which thereby automatically generates a request to enter a registered rotary switch pin code.

10. The portable radio of claim 9, wherein:
  a pass status alert is generated upon completion of an entry of the registered rotary switch pin code, without indicating whether each digit is correct or incorrect; and a fail status alert is generated upon completion of an invalid entry, without indicating whether each digit is correct or incorrect.

11. The portable radio of claim 1, wherein the portable radio is a non-keypad portable radio.

12. The portable radio of claim 1, wherein the portable radio is a non-keypad and non-display portable radio.

13. The portable radio of claim 1, wherein the default radio control function comprises a channel change control function.

14. The portable radio of claim 1, wherein the authentication control function is enabled by a push-to-talk (PTT) press and a predetermined voice command entered into the portable radio, and the portable radio in response to the predetermined voice command altering the rotary control knob to the authentication control function for registration of a user selectable rotary switch pin code.

15. The portable radio of claim 1, wherein the rotary control knob comprising the multi-position rotary control switch comprises a binary coded switch.

16. The portable radio of claim 1, wherein the rotary control knob comprising the multi-position rotary control switch comprises a sixteen-position binary coded rotary switch.

17. A method of operating a portable radio, comprising:
turning on the portable radio;
pressing a push-to-talk (PTT) button;
entering a predetermined voice command to enable programming;
altering functionality of a rotary control knob of the portable radio from a radio control function to a registration control function in response to the predetermined voice command;
entering a user selectable rotary switch pin code using the rotary control knob;
registering the user selectable rotary switch pin code as a registered rotary switch pin code for the portable radio;
reverting functionality of the rotary control knob from the registration control function back to the radio control function; and
beginning regular operation of the portable radio.

18. The method of claim 17, wherein registering the user selectable rotary switch pin code as the registered rotary switch pin code for the portable radio further comprises:
providing user feedback from the portable radio during entry acknowledging that a digit of the user selectable rotary switch pin code has been registered; and
generating a completed user feedback acknowledgement upon completion of entry of the user selectable rotary switch pin code.

19. The method of claim 17, further comprising:
turning off the portable radio;
turning on the portable radio;
playing out a request for the registered rotary pin code entry;
changing functionality of the rotary control knob from the radio control function to a rotary switch pin code mode;
entering a rotary switch pin code; and
generating a pass/fail indication based on the entry of the rotary switch pin code.

20. The method of claim 19, further comprising:
generating a pass status indication by the portable radio is response to the registered rotary switch pin code being entered; and
generating a fail status indication otherwise.

* * * * *